United States Patent
Yu et al.

(10) Patent No.: US 7,160,016 B2
(45) Date of Patent: Jan. 9, 2007

(54) LIGHT GUIDE PLATE WITH CONVERGENCE CONCAVITIES AND METHOD FOR MANUFACTURING THE LIGHT GUIDE PLATE

(75) Inventors: Tai-Cheng Yu, Tu-Chen (TW); Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 164 days.

(21) Appl. No.: 10/745,217

(22) Filed: Dec. 22, 2003

(65) Prior Publication Data

US 2004/0136174 A1    Jul. 15, 2004

(30) Foreign Application Priority Data

Dec. 20, 2002  (TW) ................................. 91136964 A

(51) Int. Cl.
*F21V 7/04*      (2006.01)
(52) U.S. Cl. .................. 362/620; 362/617; 362/619
(58) Field of Classification Search ........ 362/617–620, 362/621–623
See application file for complete search history.

(56) References Cited

U.S. PATENT DOCUMENTS

| | | | |
|---|---|---|---|
| 5,408,387 A * | 4/1995 | Murase et al. .............. 362/623 |
| 6,139,162 A | 10/2000 | Masaki | |
| 6,522,373 B1 * | 2/2003 | Hira et al. .................. 362/603 |
| 6,752,507 B1 * | 6/2004 | Wang et al. ................ 362/619 |
| 2001/0053075 A1 * | 12/2001 | Parker et al. ................. 362/31 |
| 2005/0237768 A1 * | 10/2005 | Matsumoto et al. ........ 362/620 |

FOREIGN PATENT DOCUMENTS

JP          10123329 A       5/1998

* cited by examiner

*Primary Examiner*—Sandra O'Shea
*Assistant Examiner*—James W Cranson, Jr.
(74) *Attorney, Agent, or Firm*—Wei Te Chung

(57) ABSTRACT

A light guide plate (300) for transmitting light beams from a light source to an LCD (liquid crystal display) includes: an incident surface (301) for introducing light beams into the light guide plate; an emitting surface (303) for uniformly transmitting light beams out from the light guide plate; and a bottom surface (302) opposite to the emitting surface for reflecting the light beams in directions toward the emitting surface. The light guide plate further provides a plurality of concavities (3031) on the emitting surface, for converging the light beams into the LCD. The light guide plate is a relatively simple, single integrated structure, and can obviate the need for a brightness layer in an associated LCD device.

15 Claims, 4 Drawing Sheets

LIGHT GUIDE PLATE WITH CONVERGENCE CONCAVITIES AND METHOD FOR MANUFACTURING THE LIGHT GUIDE PLATE

BACKGROUND OF THE INVENTION

1. Field of the Invention

The present invention relates to a light guide plate for use in a liquid crystal display (LCD) and a method for manufacturing the light guide plate, and particularly to a light guide plate having a simple structure including a light emitting surface configured to converge light.

2. Prior Art

In general, LCDs have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide an even light for a clear display.

A surface light source comprises a light source and a light guide plate. The light source may be a linear light source, or one or more point light sources. The light guide plate has an end face through which light is introduced, and two opposite major faces one of which functions as an emission face. The performance of the surface light source greatly depends on the characteristics of the light guide plate employed therein.

A light guide plate functions to change a direction of propagation of light beams emitted from the light source and introduced into the light guide plate, from a direction roughly parallel to the emission face of the light guide plate to a direction perpendicular to the emission face. That is, the light guide plate effectively changes the linear or point light source(s) into a surface light source, for evenly illuminating a whole display screen of the LCD.

FIG. 5 shows a conventional back light system 100, which comprises a light guide plate 103, a linear light source 101 adjacent the light guide plate 103, a reflector 104, and a brightness enhancing film 105 having a plurality of V-shaped prisms 1051. The reflector 104, the light guide plate 103 and the brightness enhancing film 105 are stacked from bottom to top in that order. The light guide plate 103 has a uniform thickness, and comprises an incident surface 1031, an emitting surface 1033, and a bottom surface 1032 opposite to the emitting surface 1033. A plurality of scattering dots 1034 is formed on the bottom surface 1032. The linear light source 101 is covered by a light source cover 102 on three sides thereof, for reflecting light beams into the light guide plate 103. The linear light source 101 is positioned adjacent the incident surface 1031 of the light guide plate 103, and emits light beams into the light guide plate 103 through the incident surface 1031. Light beams thus introduced into the light guide plate 103 are reflected to the brightness enhancing film 105 by the bottom surface 1032. The brightness enhancing film 105 converges the light beams and introduces the converged light beams into an LCD (not shown). The back light system 100 employs a plurality of optical elements and has a plurality of optical interfaces. The various optical interfaces cumulatively contribute to an unduly high loss of light intensity in the back light system 100. That is, the back light system 100 does not attain very effective optical utilization. Moreover, the brightness enhancing film 105 is generally expensive, and inflates the costs of the back light system 100 proportionately.

FIG. 6 shows another conventional back light system 200, which comprises a light source 201, a light guide plate 203, and a light source cover 202 covering three sides of the light source 201. A plurality of V-shaped prisms 2032 is formed on an emitting surface 2031 of the light guide plate 203. A cross-section of each prism 2032 is shaped like an isosceles triangle. The triangle has a vertex angle between 60 and 120 degrees, preferably 90 degrees. The light guide plate 203 further comprises a bottom surface 2033, on which a plurality of scattering dots (not shown) is formed. In operation, light beams from the light source 201 are introduced into the light guide plate 203, and then reflected and scattered by the scattering dots on the bottom surface 2033 in directions toward the emitting surface 2031.

In the back light system 200, the prisms 2032 of the emitting surface 2031 are integrated with the light guide plate 203. The luminance of the light guide plate 203 is mainly determined by the vertex angle of the prisms 2032 and the smoothness of the surfaces of the prisms 2032. To assure good luminance of the light guide plate 203, a high precision mold with tolerances of only 1 to 2 micrometers is needed for manufacturing the light guide plate 203. Generally, this kind of mold takes seven days to make. This long period operates to increase the cost of the light guide plate.

A new light guide plate that overcomes the above-mentioned disadvantages is desired.

SUMMARY OF THE INVENTION

An object of the present invention is to provide a light guide plate with a simple structure and having a low cost.

Another object of the present invention is to provide a method for manufacturing such a light guide plate.

To achieve the first above-mentioned object, a light guide plate according to the present invention includes: an incident surface for introducing light beams from a light source into the light guide plate; an emitting surface for uniformly transmitting light beams out; and a bottom surface opposite to the emitting surface for reflecting the light beams in directions toward the emitting surface. The light guide plate further defines a plurality of concavities disposed on the emitting surface. The concavities converge the light beams into an LCD, thereby effectively functioning as a negative micro-lens array. The light guide plate has a relatively simple, single integrated structure, and can obviate the need for a brightness layer in an associated LCD device.

To achieve the second above-mentioned object, a method for manufacturing the light guide plate according to the present invention comprises the steps of: providing a substrate; etching the substrate to form a mold having a plurality of curved projections; and injecting a transparent glass material or a synthetic resin into the mold to form a light guide plate having a plurality of concavities on a surface thereof.

Other objects, advantages and novel features of the invention will become more apparent from the following detailed description when taken in conjunction with the accompanying drawings; in which:

DETAILED DESCRIPTION OF THE PREFERRED EMBODIMENTS

Hereinafter, an exemplary embodiment of the present invention will be explained in detail with reference to the accompanying drawings.

Figure 1:
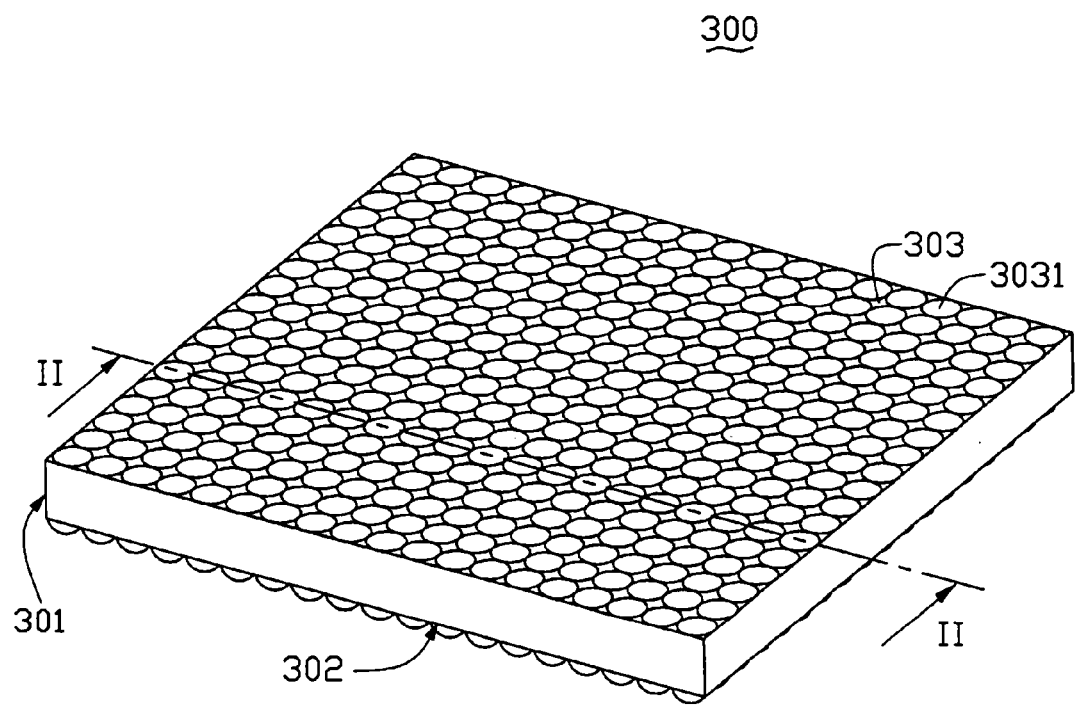
FIG. 1 is an isometric view of a light guide plate in accordance with the present invention.
Figure 2:
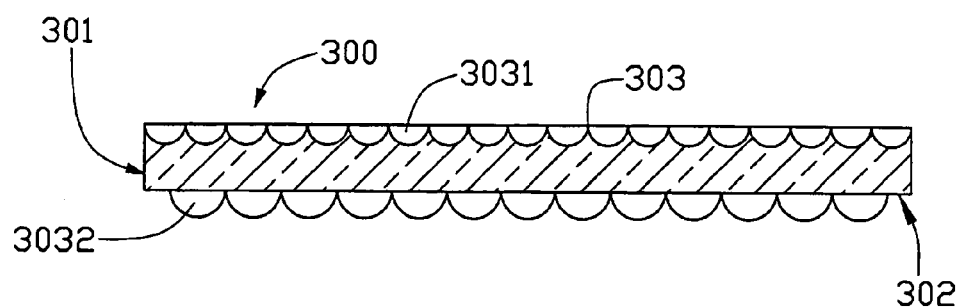
FIG. 2 is a schematic, cross-sectional view of the light guide plate taken along the line II—II of FIG. 1.

FIGS. 1 and 2 show a light guide plate 300 according to the present invention. The light guide plate 300 comprises a light incident surface 301 for introducing light beams from a light source (not shown) into the light guide plate 300, a light emitting surface 303 for uniformly transmitting light beams out to an LCD panel (not shown), and a bottom surface 302 opposite to the emitting surface 303 for reflecting light beams in directions toward the emitting surface 303. The light incident surface 301 is perpendicular to both the bottom surface 302 and the light emitting surface 303.

Figure 7:
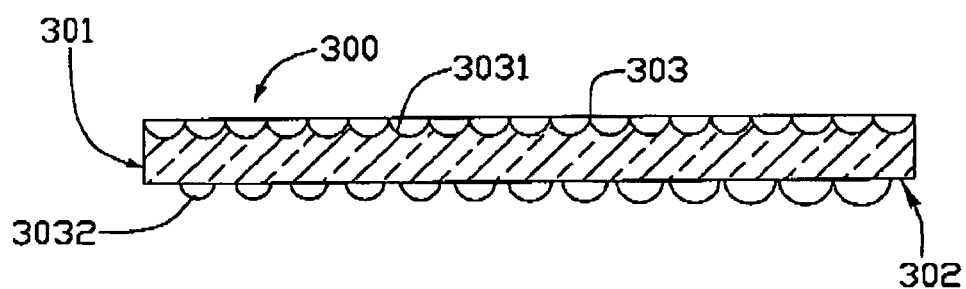
FIG. 7 is a schematic, cross-sectional view of another light guide plate, in accordance with an alternative preferred embodiment.

The bottom surface 302 includes an array of scattering dots 3032 for reflecting and scattering the light beams in directions toward the light emitting surface 303. In the illustrated embodiment, the scattering dots 3032 are generally hemispherical or subhemispherical. In alternative embodiments, the scattering dots 3032 may for example be cylindrical, cuboid, parallelepiped-shaped, or frustum-shaped. In the illustrated embodiment, the scattering dots 3032 have a uniform size and a uniform distribution density, as shown in FIG. 2. Nevertheless, generally, the intensity of the light beams decreases with increasing distance away from the incident surface 301. Therefore, in an alternative embodiment, the scattering dots 3032 may be formed so that the distribution density thereof increases exponentially with increasing distance away from the light incident surface 301, as shown in FIG. 7. In a further alternative embodiment, sizes of the scattering dots 3032 may increase exponentially with increasing distance away from the light incident surface 301. In each of the above-described alternative embodiments, the intensity of the luminance is substantially uniform over the whole emitting surface 303.

The light guide plate 300 further comprises an array of concavities 3031 evenly arranged at the emitting surface 303. The concavities 3031 function as a negative micro-lens array for converging the light beams in a predetermined area. The concavities 3031 are integrally defined in the light guide plate 303, and are generally hemispherical or sub-hemispherical.

Figure 3:
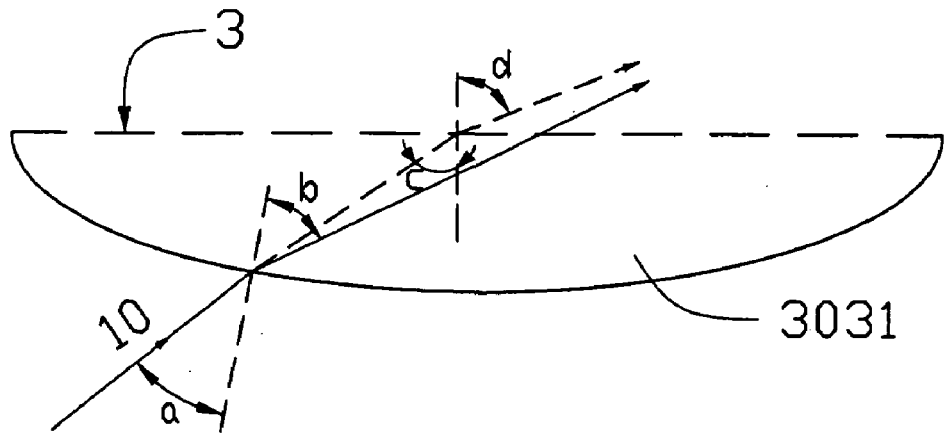
FIG. 3 is an enlarged, schematic cross-sectional view of a concavity of the light guide plate of FIG. 1.

In operation, referring to FIG. 3, a light beam 10 from the bottom surface 302 is incident on an interface of any one of the concavities 3031 at an angle of incidence a, and emits from the interface at an angle of emission b according to the following law of refraction:

$$n1/n2 = \sin(a)/\sin(b)$$

wherein n1 (n1>1) is the index of refraction of the light guide plate 300, and n2 (n2=1) is the index of refraction of air. Therefore, the incident angle a and the emitting angle b satisfy the equation:

$$n1 = \sin(a)/\sin(b)$$

Compare this with the situation at a plane surface 3 (shown as the dashed line in FIG. 3) of the light emitting surface 303. A light beam 10 is incident on an interface of the plane surface 3 at an angle of incidence c, and emits from the interface at an angle of emission d. Because the concavity 3031 defines an arc, the incident angle a is smaller than the incident angle c. According to the laws of refraction, because both of the above-described light beams 10 emit from the light guide plate 300 having a higher refractive index into the air having a lower refractive indexrefractive index, the emitting angle b must be smaller than the emitting angle d. That is, the concavity 3031 provides a converging function like a negative lens, wherein the incident angle a is determined by the curvature of the concavity 3031. When the curvature increases, the emitting angle b decreases accordingly. Therefore a highest convergence of light beams can be attained when an arc defined by the concavity 3031 is semicircular. That is, when the concavity 3031 is hemispherical.

The light guide plate 300 has a uniform thickness. In an alternative embodiment, the light guide plate 300 may be wedge-shaped. The light guide plate 300 is made from a transparent glass material or synthetic resin. Various kinds of highly transparent synthetic resins may be used, such as acrylic resin, polycarbonate resin, vinyl chloride resin, etc.

In summary, the light guide plate 300 has the following advantages. Firstly, the concavities 3031 are integrally defined in the light guide plate 300, and the scattering dots 3032 are integrally formed with the light guide plate 300. That is, the light guide plate 300 is a relatively simple, single integrated structure. Secondly, the concavities 3031 function as a negative micro-lens array, thereby obviating the need to use a brightness layer on top of the light guide plate 300. Production costs are reduced commensurately.

Figure 4:
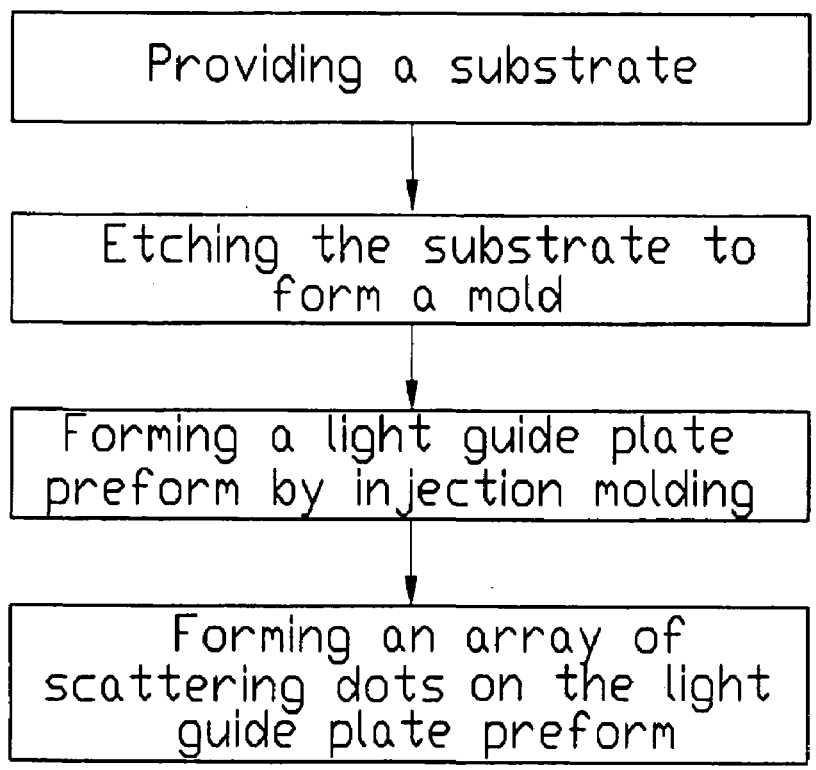
FIG. 4 is a flow chart of a method for manufacturing a light guide plate according to the present invention.
Figure 5:
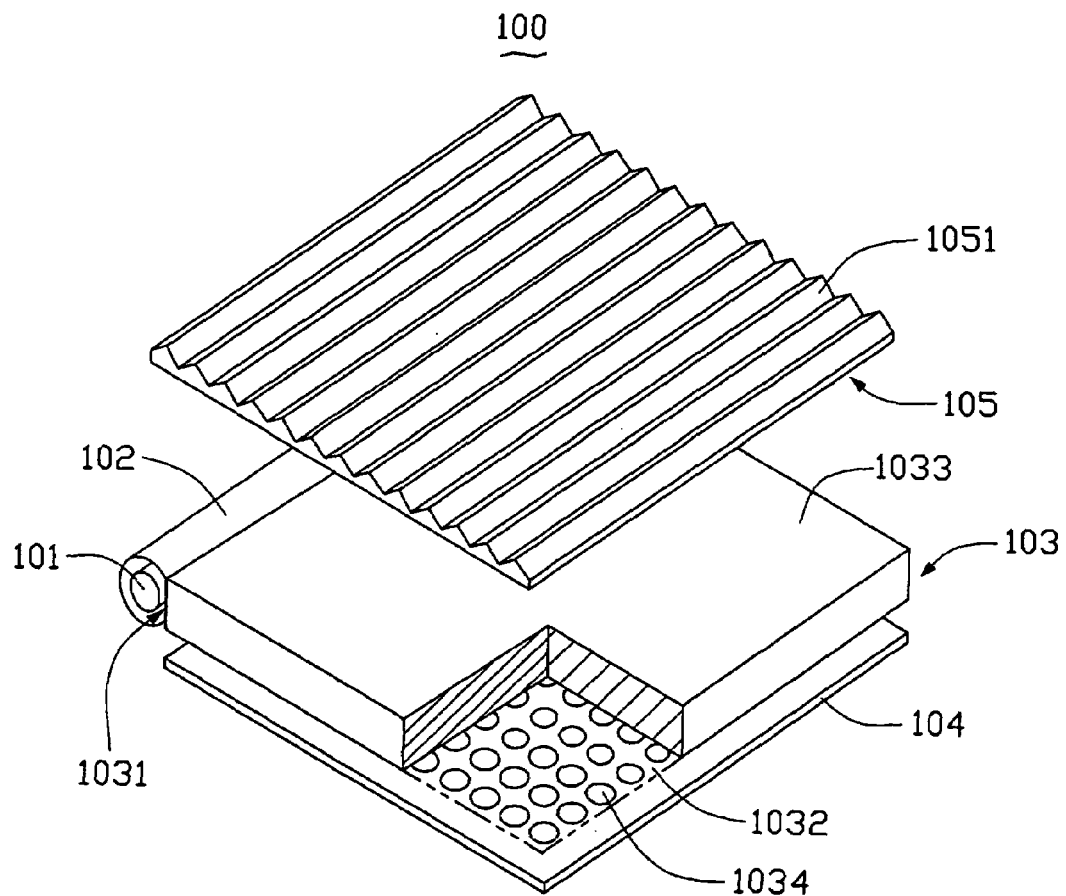
FIG. 5 is an exploded, isometric view of a conventional back light system.
Figure 6:
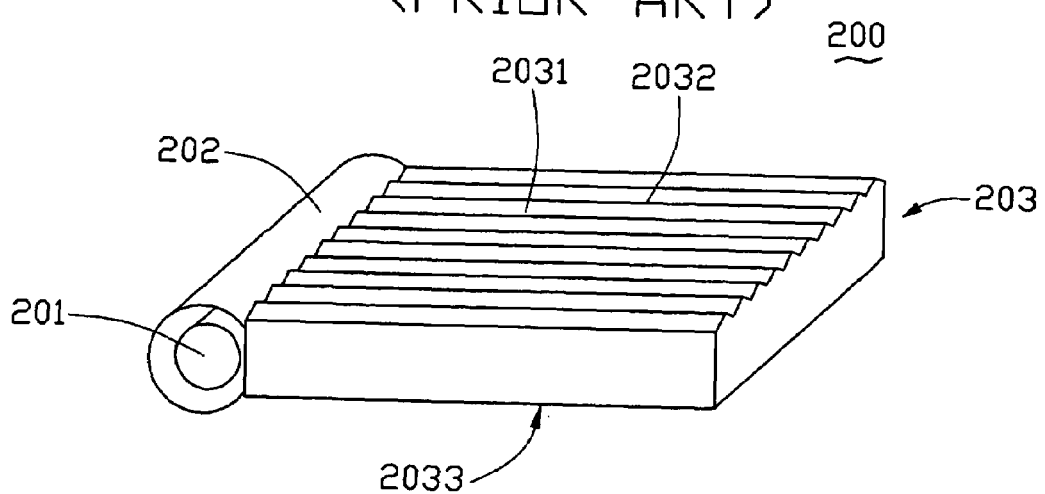
FIG. 6 is an isometric view of another conventional prior art back light system.

Referring to the FIG. 4, a method for manufacturing the light guide plate 300 according to the present invention comprises the following steps:

Firstly, providing a substrate.

Secondly, etching the substrate to form a mold having a plurality of curved projections, the projections preferably being hemispherical or sub-hemispherical.

Thirdly, forming a light guide plate preform by injection molding technology using the mold. The light guide plate preform is made from a transparent glass material or a synthetic resin, and defines the array of concavities 3031 at the light emitting surface 3031 thereof.

Fourthly, forming the array of scattering dots 3032 on the bottom surface of the light guide plate preform by printing technology, etching technology or a mechanical pressing method. The scattering dots 3032 are made from a material having high light scattering characteristics.

It is to be understood, however, that even though numerous characteristics and advantages of the present invention have been set forth in the foregoing description, together with details of the structure, function and method of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A light guide plate for transmitting light beams from a light source to a liquid crystal display, comprising:
    an incident surface configured for introducing the light beams into the light guide plate;
    an emitting surface configured for uniformly transmitting the light beams out from the light guide plate; and a bottom surface opposite to the emitting surface for reflecting the light beams in directions toward the emitting surface, the bottom surface being configured for reflecting the light beams in directions toward the emitting;

wherein a plurality of concavities is provided on the emitting surface, the plurality of concavities being configured for functioning as an array of light-converging micro-lenses.

2. The light guide plate of claim 1, wherein the light guide plate is made from a transparent glass material or synthetic resin.

3. The light guide plate of claim 1, wherein the concavities are integrally defined in the light guide plate.

4. The light guide plate of claim 1, wherein the concavities are evenly distributed on the emitting surface of the light guide plate.

5. The light guide plate of claim 1, wherein the concavities are generally hemispherical or sub-hemispherical.

6. The light guide plate of claim 1, wherein the light guide plate further comprises a plurality of scattering dots provided on the bottom surface.

7. The light guide plate of claim 6, wherein the scattering dots have a same size, and are uniformly distributed on the bottom surface.

8. The light guide plate of claim 6, wherein a distribution density of the scattering dots increases with increasing distance away from the light incident surface.

9. The light guide plate of claim 8, wherein the distribution density of the scattering dots increases exponentially with increasing distance away from the light incident surface.

10. The light guide plate of claim 6, wherein sizes of the scattering dots increase with increasing distance away from the light incident surface.

11. The light guide plate of claim 10, wherein the sizes of the scattering dots increase exponentially with increasing distance away from the light incident surface.

12. A light guide plate comprising:
an emitting surface for uniformly transmitting light beams out from the light guide plate; and
a bottom surface opposite to the emitting surface for directing the light beams in directions toward the emitting surface;
wherein a plurality of concavities is provided on the emitting surface under a condition that a horizontal diameter of each of said concavities is larger than a depth of said each of the concavities.

13. The light guide plate of claim 1, wherein the concavities are arcuate concavities.

14. A light guide plate comprising:
an emitting surface configured for uniformly transmitting light beams out from the light guide plate; and
a bottom surface opposite to the emitting surface, the bottom surface being configured for directing the light beams in directions toward the emitting surface;
wherein a plurality of concavities is provided on the emitting surface, each concavity being generally hemispherical or sub-hemispherical, each concavity thereby being configured for converging the light beams.

15. The light guide plate of claim 14, wherein the concavities are arcuate concavities.

* * * * *